United States Patent
Kojima et al.

[11] Patent Number: 5,889,808
[45] Date of Patent: Mar. 30, 1999

[54] PHOTOEXCITATION SOLID LASER AMPLIFIER PHOTOEXCITATION SOLID LASER UNIT AND SOLID LASER EXCITATION METHOD

[75] Inventors: Tetsuo Kojima; Koji Yasui, both of Tokyo, Japan

[73] Assignee: Mitsubishi Denki Kabushiki Kaisha, Tokyo, Japan

[21] Appl. No.: 825,048

[22] Filed: Mar. 27, 1997

[30] Foreign Application Priority Data

Mar. 27, 1996 [JP] Japan .................................. 8-072665

[51] Int. Cl.$^6$ ................................................ H01S 3/0941
[52] U.S. Cl. ................................ 372/75; 372/34; 372/35; 372/72
[58] Field of Search ................................ 372/70, 72, 75, 372/34, 35

[56] References Cited

U.S. PATENT DOCUMENTS

| | | | |
|---|---|---|---|
| 4,924,474 | 5/1990 | Yagi et al. | 372/75 |
| 5,033,058 | 7/1991 | Cabaret et al. | 372/75 |
| 5,661,738 | 8/1997 | Yasui et al. | 372/35 |

FOREIGN PATENT DOCUMENTS

| | | |
|---|---|---|
| 390 525 | 10/1990 | European Pat. Off. . |
| WO 96/19855 | 6/1996 | WIPO . |

OTHER PUBLICATIONS

Patent Abstracts of Japan, vol. 017, No. 009, Jan. 1993 "Semiconductor–Laser Excited Solid–State Laser Device and Controlling Method for Its Excitating Wavelength".

*Primary Examiner*—James W. Davie
*Attorney, Agent, or Firm*—Sughrue, Mion, Zinn, Macpeak & Seas, PLLC

[57] ABSTRACT

To inexpensively and in a simple configuration provide a solid laser amplifier and a solid laser unit capable of generating a high output and high quality laser beam, the unit includes a solid laser medium 5A containing active solid media; a flow tube 14 or the like allowing a cooling medium 24 for cooling the solid laser medium 5A; and a laser array 12 so controlled in temperature as to emit an excitation light 9 for exciting the solid laser medium 5A, the wavelength of which lies within the absorption spectra of a solid laser medium 5A yet does not coincide with that of the absorption spectrum peak of a solid laser medium 5A.

8 Claims, 8 Drawing Sheets

PHOTOEXCITATION SOLID LASER AMPLIFIER PHOTOEXCITATION SOLID LASER UNIT AND SOLID LASER EXCITATION METHOD

BACKGROUND OF THE INVENTION

1. Field of the Invention

The present invention relates to a solid laser amplifier, a solid laser unit and a solid laser excitation method, capable of generating a high output and high quality laser beam.

2. Description of Related Art

Figure 8:
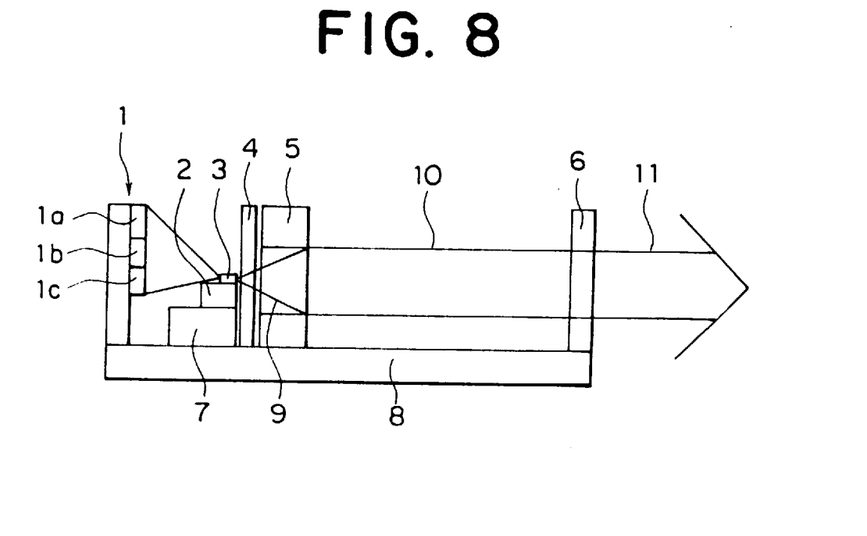
FIG. 8 is a structural drawing of a conventional photoexcitation solid laser unit.

FIG. 8 is a side view of a conventional semiconductor-laser excited solid laser unit (hereinafter, simply referred to as solid laser) disclosed, e.g., in Japanese Patent Laid-Open No. 4-240786. At the rear of a total reflection mirror 4 on the base 8, the solid laser unit comprises a diode 1, a semiconductor 2 and a semiconductor laser emitter section 3 as shown in FIG. 8. The photodiode 1, disposed at a position close to the semiconductor laser emitter section 3, comprises three types of photodiode regions 1a, 1b and 1c having predetermined different band-pass filter characteristics. The semiconductor laser 2 is provided on a temperature controller 7 for controlling its temperature. In front of the total reflection mirror 4, the solid laser unit comprises a solid laser medium 5 and a partial reflection mirror 6. The total reflection mirror 4 is so arranged as to have a high transmittance for the excitation light 9 emitted from the semiconductor laser emitter section 3 but almost totally reflect a laser beam 10.

Figure 9:
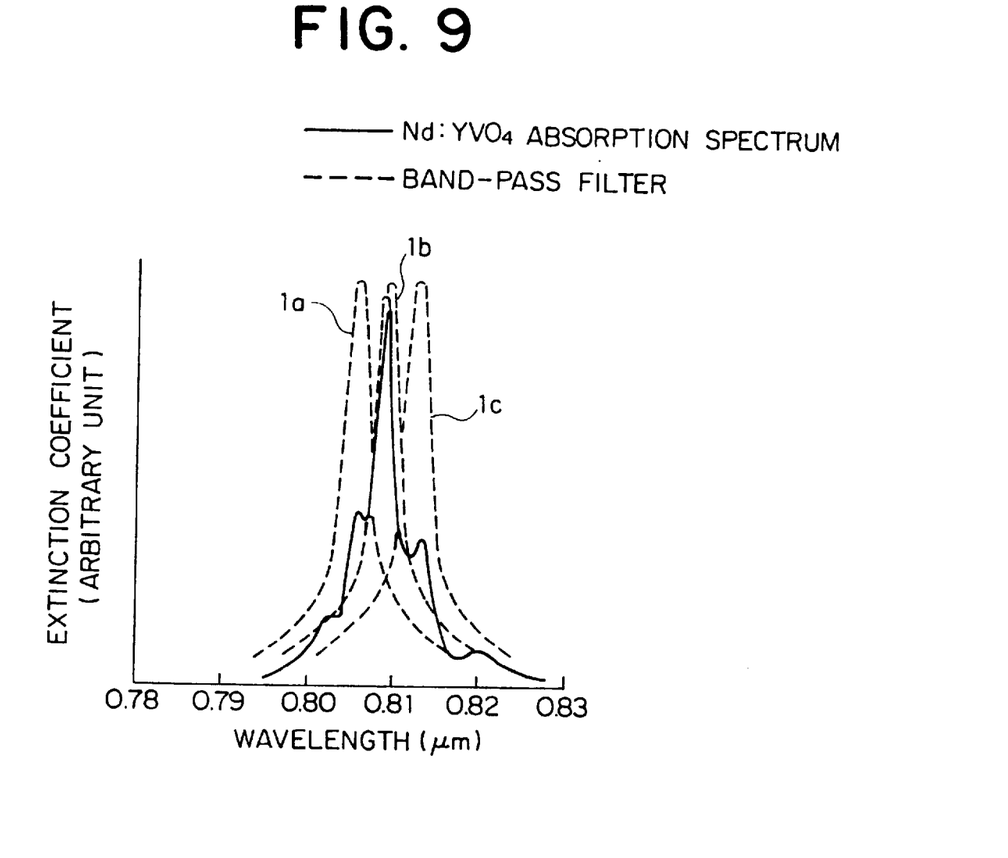
FIG. 9 is a graph illustrating the operation of the conventional photoexcitation solid laser unit of FIG 8.

FIG. 9 is a graph showing the comparison of the respective band-pass filter characteristics in the photodiode regions 1a, 1b and 1c with the absorption spectrum of a solid laser medium, e.g., made of Nd:YVO4. In FIG. 9, the respective band-pass filter characteristics in the photodiode regions 1a, 1b and 1c are indicated by broken lines, whereas the absorption spectrum of the solid laser medium is indicated by a solid line. As evident from FIG. 9, the wavelength regions of three types of band-pass filters are so designed as to overlap with the absorption spectrum of the solid laser medium. To be specific, the respective wavelength regions of three types of band-pass filters are allotted to the photodiode regions 1a, 1b and 1c from the short wavelength side and the peak of the filter of the photodiode region 1b among them in the wavelength region is so designed as to coincide with the peak wavelength of the absorption spectrum of the solid laser medium.

The conventional solid laser unit is so constituted as mentioned above wherein the excitation light 9 emitted from the semiconductor laser emitter section 3 is introduced into the solid laser medium 5 to convert the solid laser medium 5 into a laser amplification medium by exciting it. The natural emission light generated from the laser amplification medium is amplified while travelling and returning between the light resonator comprising a total reflection mirror 4 and a partial reflection mirror 6 to form a directional laser beam 10, and is emitted outward as laser beam 11 when its energy reaches or exceeds a predetermined magnitude.

Setting the oscillation wavelength of the semiconductor laser 2 can be accomplished by the temperature control of the semiconductor laser 2. Thus, with the conventional solid laser unit, as disclosed in Japanese Patent Laid-Open No. 4-240786, by monitoring the currents of the photodiode regions 1a, 1b and 1c while controlling the temperature of the semiconductor laser 2 with a thermocontroller 7 and maximizing the monitor current of the photodiode region 1b in which the peak of the band-pass filter in wavelength region is so designed as to coincide with the peak wavelength of absorption spectrum of the solid laser medium 5, the wavelength peak of oscillation of the semiconductor laser 2 and the peak wavelength of the absorption spectrum of the solid laser medium 5 are made coincident with each other.

With the conventional solid laser unit, as mentioned above, by an arrangement of setting the oscillation wavelength of the peak of the semiconductor laser in such a manner as to coincide with the peak wavelength of absorption spectrum of the solid laser medium 5, the excitation efficiency of the solid laser medium 5 is elevated.

With such an arrangement, however, excitation by a large power semiconductor laser to obtain a high output would lead to a strong excitation near the end face of the solid laser medium 5, thereby causing a phenomenon that the intensity distribution of light in the solid laser medium becomes nonuniform and the shape of a laser beam is broken. Consequently, the conventional arrangement had a problem that a high power and high quality beam could not be generated even though a higher excitation efficiency was possible.

Furthermore, since the monitor currents from three photo diodes 1a, 1b and 1c were compared and the thermocontrol of the semiconductor laser 2 was performed in such a manner that the monitor current of the photo diode 1b is maximized as mentioned above, the conventional solid laser unit also had problems that the need for constructing a complicated thermocontrol system did not only complicate the unit arrangement but raised the cost.

BRIEF SUMMARY OF THE INVENTION

The present invention has an object of providing a high quality and high power laser amplification medium by enabling the solid laser medium to be uniformly excited. Another object of the invention is providing a solid laser amplifier and a solid laser unit capable of generating a high power and high quality laser beam inexpensively in a simple arrangement.

A photoexcitation solid laser amplifier according to the present invention comprises: a solid laser medium containing active solid media; cooling means for cooling this solid laser medium; and an excitation light source for exciting this laser medium and emitting light having a wavelength that lies within the absorption spectrum range of said solid laser medium and is not coincident with the wavelength of the absorption spectrum peak, thus permitting the solid laser medium to be uniformly excited and enabling a solid laser amplifier for generating a high power and high quality laser beam to be obtained inexpensively in a simple arrangement.

With such an arrangement, the excitation light emitted from the excitation light source becomes a light having a wavelength that lies within the absorption spectrum range of said solid laser medium but is not coincident with the wavelength of the absorption spectrum peak and such a light excites the solid laser medium. The component not generating a laser light among the light absorbed in the solid laser medium is converted into heat and the solid laser medium heated by this heat is so arranged as to be cooled by cooling means, thus permitting the solid laser medium to be cooled.

And, a photoexcitation solid laser amplifier according to the present invention comprises: a solid laser medium containing active solid media; cooling means for cooling this solid laser medium; an excitation light source for emitting a ray of light exciting the laser medium; and wavelength setup means for setting the wavelength of light emitted by this excitation light source in such a manner as to lie within the absorption spectrum range of the above solid laser medium and not coincident with the wavelength of the absorption spectrum peak, thus permitting the solid laser medium to be uniformly excited and providing a solid laser amplifier for generating a high power and high quality laser beam.

With such an arrangement, the wavelength setup means sets the wavelength of the light emitted by the excitation light source in such a manner as to lie within the absorption spectrum range of the above solid laser medium and not coincident with the wavelength of the absorption spectrum peak. The light emitted by the excitation light source excites the solid laser medium. Among the light absorbed in the solid laser medium, the component not generating a laser light is converted into heat and the solid laser medium heated by this heat is so arranged as to be cooled by cooling means, thus permitting the solid laser medium to be cooled.

And, a photoexcitation solid laser amplifier according to the present invention has cooling means for cooling the solid laser medium composed of a flow tube allowing a cooling medium to flow, thus permitting the solid laser medium to be cooled.

With such an arrangement, among the light absorbed in the solid laser medium, the component not generating a laser light is converted into heat and the solid laser medium heated by this heat is so arranged as to be cooled with the cooling medium flowing in the flow tube disposed around it, thus permitting the solid laser medium to be cooled.

And, a photoexcitation solid laser amplifier according to the present invention comprises a condenser disposed in such a manner as to surround the solid medium and an opening provided thereon for introducing a light for exciting the solid laser medium, thus enabling the light emitted from the excitation light source to be introduced into the condenser with hardly any loss and moreover a high quality laser amplification to be fulfilled at a high efficiency by reflecting the light of the excitation light source in the condenser.

With such an arrangement, the light emitted from the excitation light source is introduced into the condenser through the opening of the condenser disposed in such a manner as to surround the solid medium and excites the solid laser medium. The light not absorbed by the solid laser medium is reflected on the internal surface of the condenser and excites the solid laser medium again.

And, a photoexcitation solid laser amplifier according to the present invention has the inside surface of said condenser composed of a light diffuse reflection surface.

With such an arrangement, the light emitted from the excitation light source is introduced into the condenser through the opening of the condenser disposed in such a manner as to surround the solid medium and excites the solid laser medium. The light not absorbed by the solid laser medium is diffusely reflected on the internal surface of the condenser and excites the solid laser medium again, so that the light of the excitation light source can be reflected more uniformly in the condenser to excite the solid laser medium in an extremely uniform manner, thus enabling a further higher quality laser amplification to be fulfilled at a high efficiency.

And, a photoexcitation solid laser amplifier according to the present invention is so arranged as to employ a semiconductor laser as the excitation light source, thus permitting a high power light to be generated at a high efficiency from a compact excitation light source and enabling a solid laser amplifier for generating a high quality and high power laser beam at a high efficiency to be obtained in a compact arrangement.

With such an arrangement, a semiconductor laser emits a ray of light for exciting the solid laser medium containing active solid medium.

Furthermore, a photoexcitation solid laser amplifier according to the present invention comprises a optical resonator for taking out a light from said solid laser medium, thus permitting a high quality and high power laser beam to be generated.

With such an arrangement, the optical resonator takes out a light from said solid laser medium, thus permitting a high quality and high power laser beam to be generated.

Yet further, a solid laser excitation method according to the present invention excites a solid laser medium by using a ray of light having a wavelength that lies within the absorption spectrum range of a solid laser medium and is not coincident with the wavelength of the absorption spectrum peak, thus permitting the solid laser medium to be excited uniformly.

With such an arrangement, a light ray of light having a wavelength that lies within the absorption spectrum range of a solid laser medium and is not coincident with the wavelength of the absorption spectrum peak excites the solid laser medium, thus permitting the solid laser medium to be excited uniformly.

DETAILED DESCRIPTION OF THE PREFERRED EMBODIMENTS

Embodiment 1

Figure 1A:
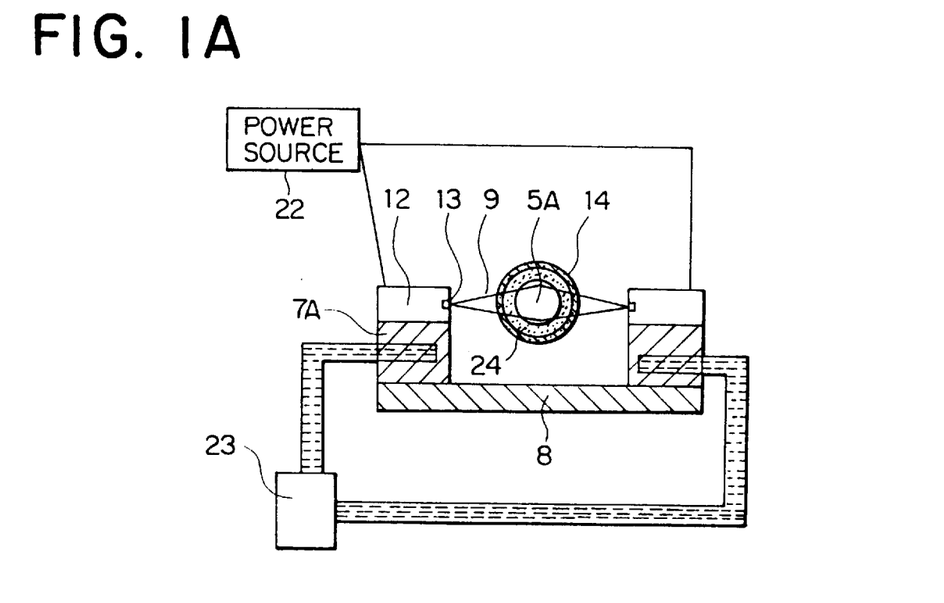
FIG. 1A and FIG. 1B are structural drawings of a photoexcitation solid laser amplifier according to Embodiment 1 of the present invention.
Figure 1B:
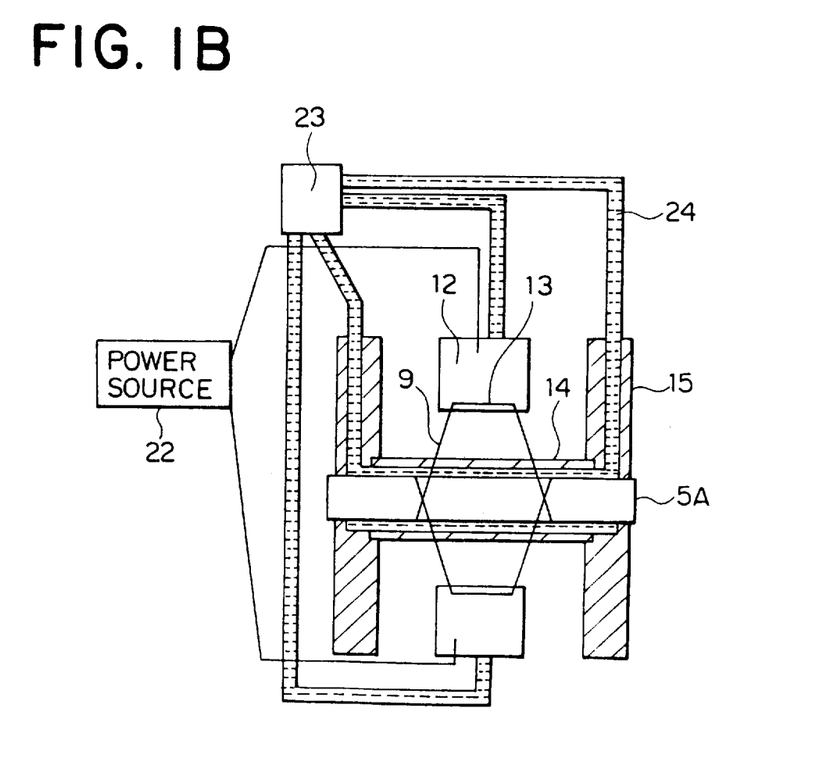

FIG. 1A and FIG. 1B are structural drawings showing a semiconductor laser excitation solid laser amplifier in Embodiment 1 of the present invention, where FIG. 1A and FIG. 1B are a transverse sectional view and a horizontal sectional view, respectively.

In these sectional views, portions 8 and 9 are the same as with the conventional unit shown in FIG. 8. The solid laser medium 5A containing active solid laser media is made, for example, of Nd:YAG (Nd:Yttrium Aluminum Garnet), the section of which assumes the shape of a circular rod. On both ends of the base 8, cooling plates 7A for cooling the semiconductor laser array mentioned later are provided, on which a semiconductor laser array 12 equipped with a light emitter section 13 is provided. And, on the solid laser medium 5A, a flow tube 14 is provided in such a manner as to envelop it, while a cooling medium 24 is allowed to flow between the flow tube 14 and the solid laser medium 5A.

The flow tube 14 and the solid laser medium 5A are supported by a support mechanism 15. The support mechanism 15 is provided with a side board having a mechanism for introducing the cooling medium 24 from outside the unit into the flow tube 14. The cooling plate 7A is also provided with a mechanism for causing the cooling medium 24 to flow therethrough and the cooling medium 24 is circulated by the cooling medium circulator 23 equipped with the thermocontrol mechanism thereof (not shown).

Incidentally,the portion 22 is a power source for letting an electric current flow through the semiconductor laser array 12.

In the solid laser amplifier composed above, the cooling medium circulator 23 controls the temperature of the cooling plate 7A by controlling that of the cooling medium 24 to a set value in such a manner as that the peak wavelength of an excitation light 9 emitted from the light emitter section 13 of the semiconductor laser array 12 is not coincident with that of absorption spectrum of the solid laser medium 5A within the absorption spectrum range (absorption characteristics relative to wavelength) of the solid laser medium 5A containing active solid laser media and moreover lets the cooling medium 24 flow in the flow tube 14 via the support mechanism 15. The solid laser medium 5A is excited by the excitation light 9 from the flank to become a laser amplification medium for amplifying a laser beam.

The setup (target) temperature of the cooling medium 24 controlled by the cooling medium circulator 23 can be determined in advance as one example as follows.

First, an absorption spectrum of the solid laser medium 5A is measured with a spectrophotometer or the like. When a solid laser medium SA whose absorption spectra are known, such as, e.g., Nd:YAG to be used in embodiments of the present invention, is employed, this step can be omitted. Next, the relation among operating current (output) of the semiconductor laser array 12, temperature of the cooling medium 24 (can be set with the cooling medium circulator 23) and wavelength of an excitation light emitted from the semiconductor laser array 12 is determined by measurements. The wavelength of an excitation light can be measured with a spectrometer, optical spectrum analyzed or the like.

When the operating current of the semiconductor laser array 12 and the temperature of the cooling medium are determined, the operating temperature of the semiconductor laser array 12 is determined and consequently the semiconductor laser array 12 comes to emit an excitation light having a certain definite wavelength. Thus, determining the operating current of the semiconductor laser array 12 to a certain value enables the temperature of the cooling medium to be determined in such a manner that the wavelength of an excitation light emitted therefrom is not coincident with the peak wavelength of absorption spectrum of the solid laser medium 5A. Like these, the cooling medium circulator 23, cooling medium 24 and cooling plate 7A constitute wavelength setup means of the present invention.

Meanwhile, among the light 9 absorbed in the solid laser medium 5A, the components not converted into a laser beam are converted into heat and the solid laser medium SA heated by this heat is cooled with the cooling medium 24 flowing in the flow tube 14 disposed around it.

Figure 2A:
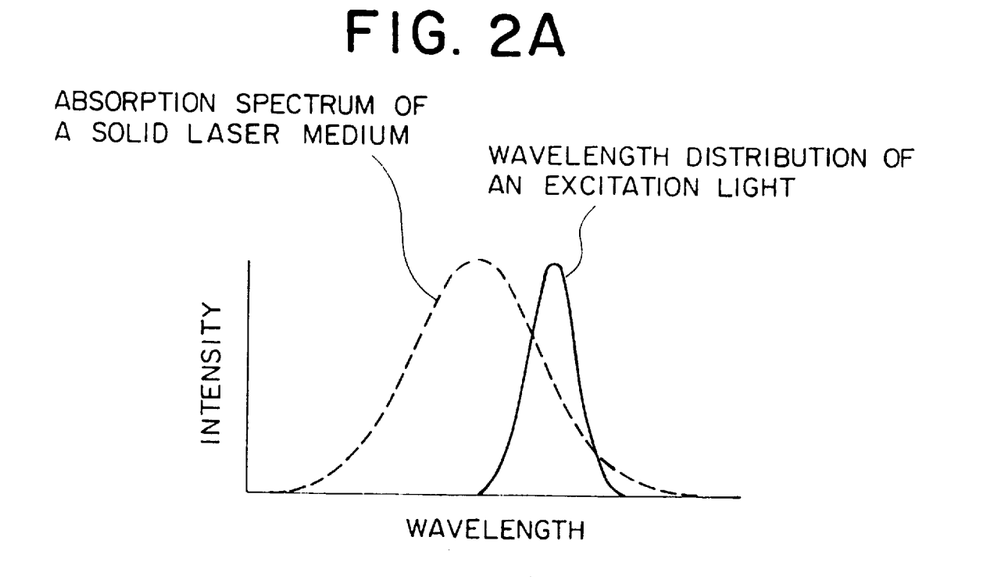
FIG. 2A and FIG. 2B are graphs illustrating the operation of a photoexcitation solid laser amplifier according to Embodiment 1 of the present invention.
Figure 2B:
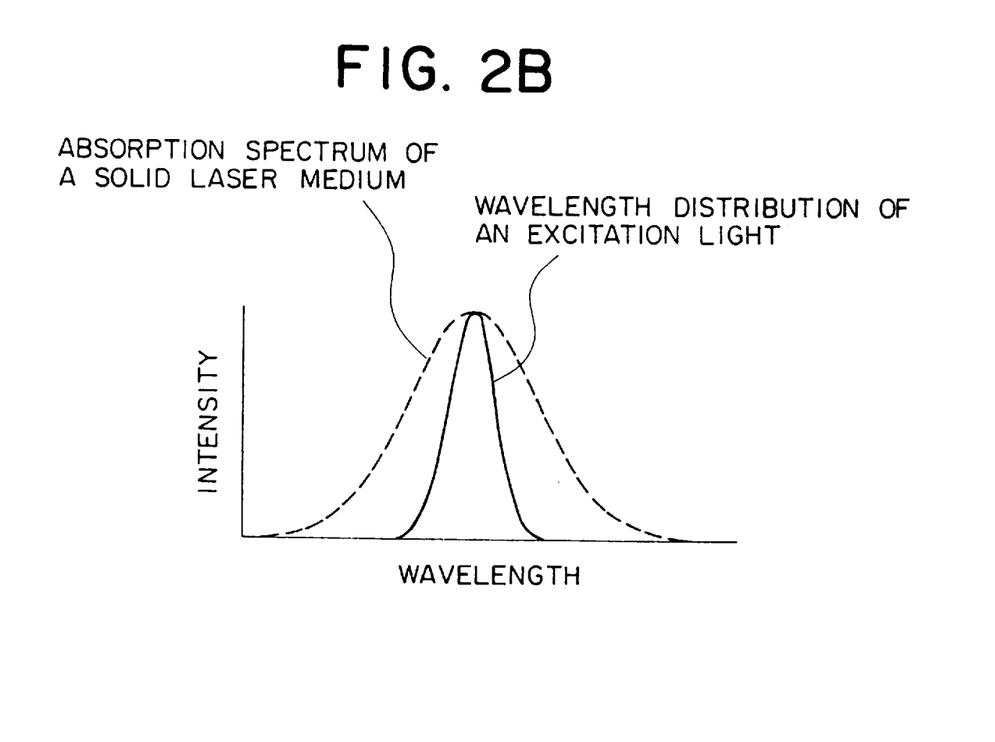

FIG. 2A and FIG. 2B are graphs showing the relation between the absorption spectrum of a solid laser medium and the wavelength distribution of excitation light, where FIGS. 2A and FIG. 2B show one example of relation between the absorption spectrum of a solid laser medium according to Embodiment 1 and the wavelength distribution of excitation light and the relation between the absorption spectrum of a solid laser medium according to a comparative example and the wavelength distribution of excitation light, respectively. In this embodiment, the peak wavelength of an excitation light lies within the absorption spectrum range of a solid laser medium and is not coincident with the peak wavelength of the absorption spectrum of the solid laser medium. On the other hand, in the comparative example, the peak wavelength of an excitation light is coincident with the peak wavelength of the absorption spectrum of the solid laser medium.

Figure 3:
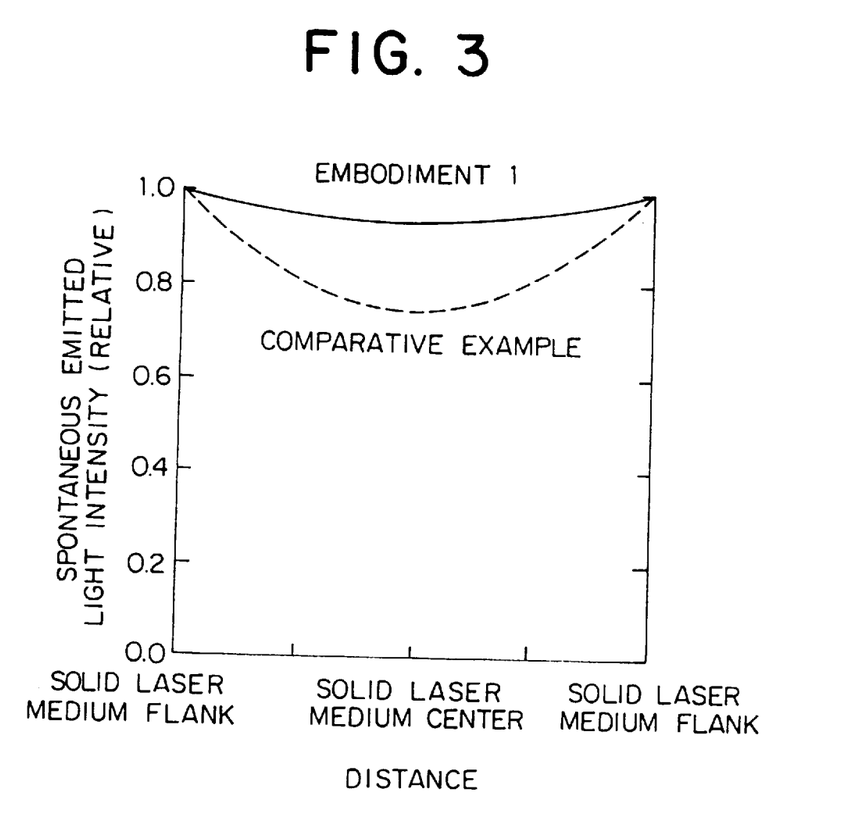
FIG. 3 is a graph illustrating the operation of a photoexcitation solid laser amplifier according to Embodiment 1 of the present invention.

FIG. 3 is a graph showing the spontaneous emitted light intensity distribution in the perpendicular direction to the axes of solid laser media according to Embodiment 1 and Comparative Example, where the solid and broken lines correspond to the intensity distribution of Embodiment 1 and Comparative Example, respectively. In the spontaneous emission intensity distribution of Embodiment 1 shown in FIG. 3, the wavelength peak of excitation light for a Nd atomic density of 1.1% is set to 803.4 nm, shifted by 5.1 nm, that for a Nd atomic density of 1.0% is set to 803.7 nm, shifted by 4.8 nm, that for a Nd atomic density of 0.8% is set to 804.6 nm, shifted by 3.9 nm and that for a Nd atomic density of 0.6% is set to 806.4 nm, shifted by 2.1 nm from the peak wavelength of 808.5 nm in the absorption spectrum of Nd:YAG, where the extinction coefficient of excitation light in the solid laser medium becomes 2 $cm^{-1}$, whereas Comparative Example uses Nd:YAG as the solid laser medium 5A having a Nd concentration of 1.1 at. % to obtain a spontaneous emission intensity distribution that the wavelength peak of excitation light and the wavelength of the absorption spectrum peak of the solid laser medium are coincident with each other and the extinction coefficient of excitation light in the solid laser medium is set to 4.1 $cm^{-1}$.

In Comparative Example, since the wavelength peak of excitation light and the wavelength of the absorption spectrum peak of the solid laser medium are coincident with each other, the excitation light is strongly absorbed near the flank of the solid laser medium and the absorption ratio near the center decreases, that is, the portion near the flank is strongly excited and the portion near the center is excited to a lesser degree, so that the spontaneous emission intensity becomes high near the flank and low near the center of the solid laser medium. On the other hand, in Embodiment 1, since the wavelength peak lies within the absorption spectrum range of the above solid laser medium and is not coincident with the wavelength of the absorption spectrum peak, the absorption ratio of excitation light is almost equal for the portion near the flank and for the portion near the center of the solid laser medium. To be concrete, since the excited ratio of the solid laser medium becomes almost equal for the portion near the flank and for the portion near the center, the spontaneous emission intensity distribution is almost uniform in a direction perpendicular to the axis of the solid laser medium.

Incidentally, Embodiment 1 has an arrangement wherein two pieces of semiconductor laser arrays 12 are disposed on the flank, but the present invention is not limited to two array. The number of laser arrays may be one or not less than three and the disposed positions thereof may be selected from among the positions at which the excitation light 9 emitted from the emitter section 13 of the semiconductor laser array 12 is incident to the solid laser medium 5A.

As mentioned above, since the wavelength peak of excitation light was set in such a manner as to lie within the absorption spectrum range of the above solid laser medium but not coincident with the wavelength of the absorption spectrum peak, the semiconductor laser excited solid laser amplifier can uniformly excite the solid laser medium and fulfill a high quality amplification.

Embodiment 2

Figure 4A:
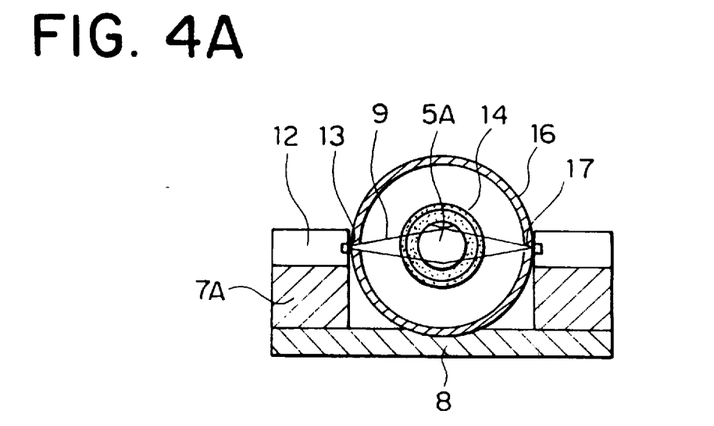
FIG. 4A to FIG. 4C are structural drawings of a photoexcitation solid laser amplifier according to Embodiment 2 of the present invention.
Figure 4B:
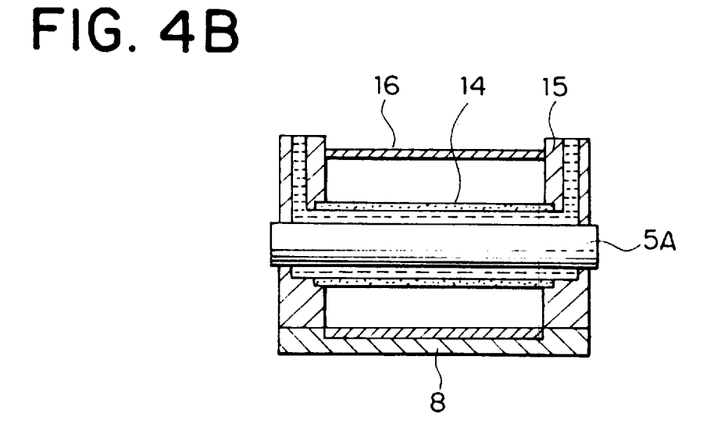
Figure 4C:
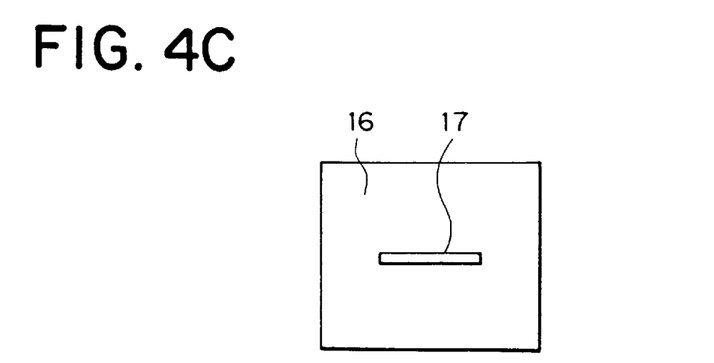

FIG. 4A to FIG. 4C are structural drawings of a semiconductor laser excited solid laser amplifier according to Embodiment 2 of the present invention, where FIG. 4A and FIG. 4B are transverse and longitudinal sectional views and FIG. 4C is a side view with the condenser viewed from the side. In FIGS. 4A to FIG. 4C numeral 16 denotes a condenser so disposed as to enclose the solid laser medium 5A and so arranged that the inside surface reflects an excitation light 9, on which an opening 17 for introducing the excitation light 9 emitted from the emitter section 13 of the semiconductor laser medium 12 to the interior is provided. In Embodiment 2, the condenser 16 is made, for example, by having the inside surface of metal ground in a mirror surface or the inside surface of glass subjected to a total reflection coating for excitation light 9. The semiconductor laser array 12 is disposed with the emitter section 13 brought close to the opening 17 so that the excitation light emitted from the emitter section 13 can be introduced through the opening 17 made on the condenser 16 to the interior thereof with hardly any loss.

In the semiconductor laser excited solid laser amplifier composed as mentioned above, as with Embodiment 1, setting of a wavelength is accomplished by controlling the cooling plate 7A in temperature with the aide of the cooling medium together with the cooling medium circulator not shown of FIG. 1A and FIG. 1B in such a manner that wavelength peak of excitation light 9 emitted from the emitter section 13 of the semiconductor laser array 12 lies within the absorption spectrum range of the above solid laser medium and is not coincident with the wavelength of the absorption spectrum peak. The solid laser medium 5A is excited from the flank by an excitation light 9 introduced without loss into the condenser 16 through the opening 17 and becomes a laser amplification medium for amplifying a laser beam.

In the above arrangement, the excitation light 9 not absorbed in the solid laser medium 5A is so arranged as to be reflected from the inside surface of the condenser 16 after passing through the solid laser medium 5A and to uniformly excite the solid laser medium 5A again, so that the solid laser medium 5A can be excited uniformly and efficiently and a high quality laser amplification can be efficiently carried out.

According to the arrangement shown in Embodiment 2, since the excitation light 9 not absorbed in the solid laser medium 5A is so arranged as to be reflected from the inside surface of the condenser 16 after passing through the solid laser medium 5A and to uniformly excite the solid laser medium 5A again, the solid laser medium 5A can be excited uniformly and efficiently and a further higher quality laser amplification can be efficiently carried out.

Embodiment 3

Figure 5A:
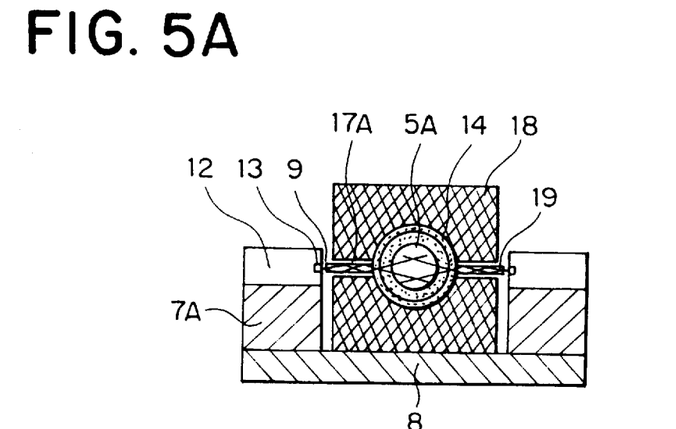
FIG. 5A to FIG. 5C are structural drawings of a photoexcitation solid laser amplifier according to Embodiment 3 of the present invention.
Figure 5B:
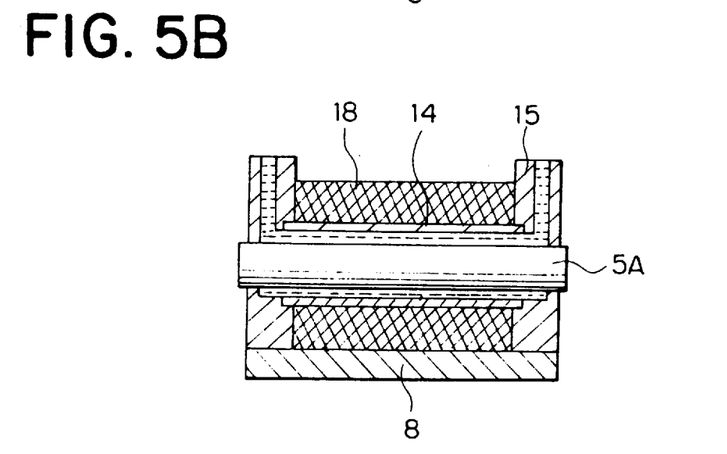
Figure 5C:
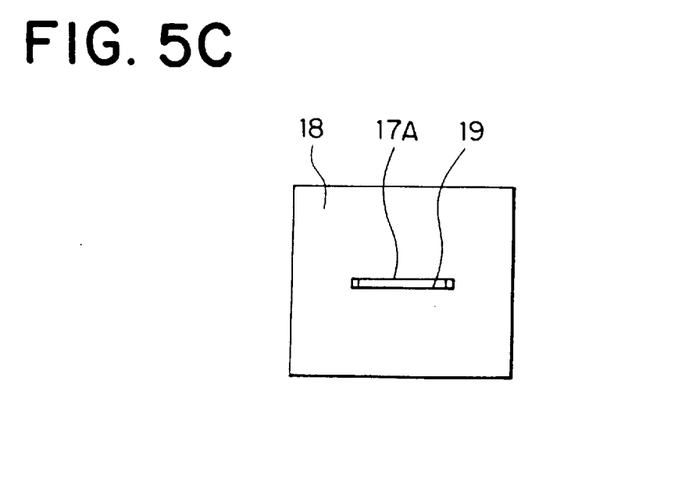

FIG. 5A to FIG. 5C are structural drawings of a semiconductor laser excited solid laser amplifier according to Embodiment 3 of the present invention, where FIG. 5A and FIG. 5B are transverse and longitudinal sectional views and FIG. 5C is a side view with the diffuse reflection condenser viewed from the side. In FIG. 5, numeral 18 denotes a diffuse reflection condenser so disposed as to enclose the solid laser medium 5A and having the inside surface comprising a diffuse reflection surface, on which an opening 17A is bored. Numeral 19 denotes an optical waveguide element for guiding an excitation light 9 made of rod-shaped, for example, sapphire, undoped YAG (Yttrium Aluminum Garnet) or glass having a high refractory index for the excitation light 9 and disposed in the opening 17A. The semiconductor laser array 12 is so placed with the emitter section 13 brought close to the flank of the optical waveguide element 19 so that the excitation light 9 emitted from the emitter section 13 can be introduced through the end of the optical waveguide element 19 to the interior thereof with hardly any loss.

In the semiconductor laser excited solid laser amplifier composed as mentioned above, as with Embodiment 1, setting of a wavelength is accomplished by controlling the cooling plate 7A in temperature with the aide of the cooling medium together with the cooling medium circulator 23 in FIG. 1 in such a manner that wavelength peak of excitation light 9 emitted from the emitter sections 13 of the semiconductor laser array 12 lies within the absorption spectrum range of the above solid laser medium 5A yet is not coincident with the wavelength of the absorption spectrum peak. A nonreflection coating for excitation light 9 is applied to the flank of the optical waveguide element 19, and the excitation light is guided into the optical waveguide element 19 with hardly any loss. The optical waveguide element 19 is made of, e.g., sapphire, undoped YAG (Yttrium Aluminum Garnet) or glass having a high refractive index for the excitation light 9. Because of as large a refractive index as 1.7 to 1.8, the excitation light 9 obliquely incident to the optical waveguide element 19 is totally reflected on the bottom and top surfaces of the optical waveguide element 19 and is guided into the diffuse reflection condenser 18 without loss. The solid laser medium 5A is excited from the flank by the excitation light 9 introduced into the diffuse reflection condenser 18 without loss from the opening 17 and becomes a laser amplification medium for amplifying a laser beam.

In the above arrangement, the excitation light 9 not absorbed in the solid laser medium SA is diffusely reflected from the inside surface of the diffuse reflection condenser 18 after passing through the solid laser medium 5A to uniformly excite the solid laser medium 5A again.

According to the arrangement shown in Embodiment 3, since the excitation light 9 not absorbed in the solid laser medium 5A is so arranged as to be diffusely reflected from the inside surface of the diffuse reflection condenser 18 after passing through the solid laser medium 5A to uniformly excite the solid laser medium 5A again, the solid laser medium 5A can be excited uniformly and efficiently and a further higher quality laser amplification can be efficiently carried out.

Embodiment 4

Figure 6:
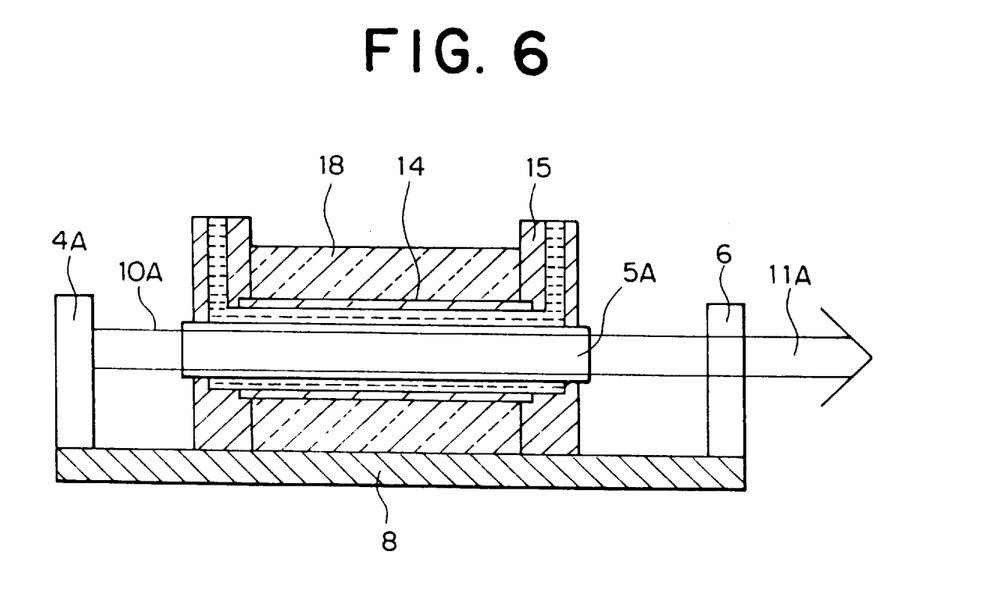
FIG. 6 is a structural drawing of a photoexcitation solid laser unit according to Embodiment 4 of the present invention.

For all of the above embodiments, the arrangement as solid laser amplifier was described. As shown in FIG. 6, for example, if a semiconductor laser excited solid laser amplifier having the same structure as Embodiment 3 shown in FIG. 5A to FIG. 5C is used and an optical resonator is constructed by installing a total reflection mirror 4A and a partial reflection mirror 6 in the front and rear of the solid laser medium 5A containing active solid laser media, spontaneous emitted light generated by the excited solid laser medium 5A is amplified while travelling and returning between the optical resonator comprising the mirror 4A and mirror 6 to become a directional laser beam 10A, and can be taken out as laser beam 11A to outside when reaching to or exceeding a predetermined magnitude, so that this arrangement can be employed as a semiconductor laser excited solid laser unit and a high quality laser beam can be obtained at high efficiency.

Embodiment 5

Figure 7A:
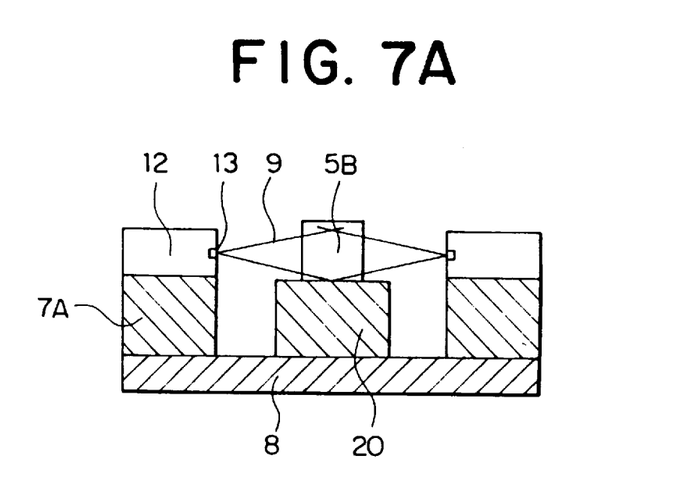
FIG. 7A and FIG. 7B are structural drawings of a photoexcitation solid laser unit according to Embodiment 5 of the present invention.
Figure 7B:
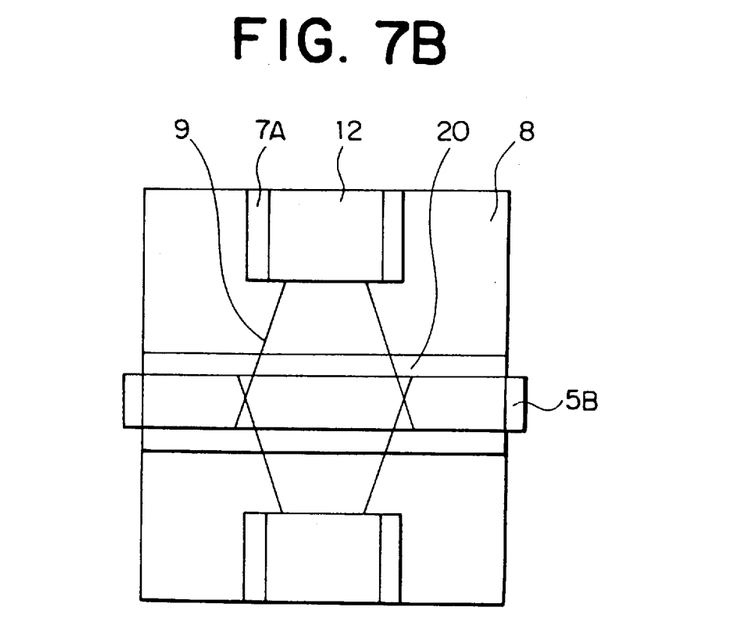

In Embodiment 1 to Embodiment 4, a solid laser medium, a flow tube and a condenser having a circular section and a diffuse reflection condenser having a circular section of the inside surface were described, but the section is not limited to a circle in any of them and may be, e.g., a rectangle, a ellipse or any other shape. And an arrangement of cooling the solid laser medium with a cooling medium flowing in the flow tube is employed but the cooling means of the present invention is not limited to this and any cooling means may be available. As shown in FIG. 7A and FIG. 7B for example, if a rod-shaped solid laser medium SA having a square section is so arranged as to be placed on a cooling plate 20, the solid laser medium 5A can be cooled in a simpler arrangement.

Furthermore, in the above embodiments, a temperature control arrangement composed of a cooling medium circulator, a cooling plate, a cooling medium and so on was shown as wave setup means, but an electronic cooling element such as Peltier element can be also applied instead to the cooling plate or the like. Also in this case, by determining the temperature of an electronic cooling element, i.e., the drive current thereof, as in Embodiment 1, the setup of the wavelength of excitation by the semiconductor laser array can be performed.

Embodiment 6

In any of the above embodiments, an example of employing a semiconductor laser as excitation light source to set the peak wavelength of excitation light through aids of thermocontrol (such as cooling medium circulator or electronic cooling element) as wave setup means in such a manner as to lie within the absorption spectrum range of a solid laser medium containing active solid laser media and to be not coincident with the wavelength of the absorption spectrum peak of the solid lasermedium was shown, but the wavelength means of the present invention is not limited to these, but other variable wavelength lasers such as, e.g., titanium sapphire laser may be employed as excitation light source and the wavelength of this excitation light may be changed by using e.g., an optical birefringence element or other optical elements such as etalon plate to one not coincident with that of the absorption spectrum peak of the solid laser medium within the absorption spectrum range.

Or, without the provision of such wavelength setup means, it is only necessary to employ other fixed-wavelength lasers such as, e.g., solid laser or ion laser as excitation light source which oscillates at a wavelength not coincident with that of the absorption spectrum peak within the absorption spectrum range of the solid laser medium.

Incidentally, in any of the above embodiments, an example of employing Nd:YAG (Nd:Yttrium Aluminum Garnet) as solid laser medium was shown, but the present invention is not limited to this and is applicable to another solid laser medium so long as it is capable of photoexcitation.

What is claimed is:

1. A photoexcitation solid laser amplifier, comprising:

a solid laser medium containing active solid media;

an excitation light source for exciting said solid laser medium; and cooling means for cooling said solid laser medium and setting the operating temperature of said excitation light source so that said excitation light source emits light having a wavelength lying within the absorption spectrum of said solid laser medium but not coincident with a wavelength of a peak of the absorption spectrum.

2. The photoexcitation solid laser amplifier as set forth in claim 1, wherein said cooling means for cooling said solid laser medium consists of a flow tube allowing a cooling medium to flow.

3. The photoexcitation solid laser amplifier as set forth in claim 1, further comprising a condenser disposed in such a manner as to surround said solid laser medium and having an opening for introducing the light emitted from the light source, which serves to reflect the light introduced from said opening and not absorbed by said solid laser medium toward said solid laser medium.

4. The photoexcitation solid laser amplifier as set forth in claim 3, wherein an inside surface of said condenser consists of a light diffuse reflection surface.

5. The photoexcitation solid laser amplifier as set forth in claim 1, wherein said excitation light source is a semiconductor laser.

6. The photoexcitation solid laser amplifier as set forth in claim 1, further comprising:

a light resonator for extracting a light from said solid laser medium.

7. A photoexcitation solid laser amplifier, comprising:

a solid laser medium containing active solid media;

cooling means for cooling said solid laser medium;

an excitation light source for emitting a ray of light exciting said laser medium; and wavelength setup means for setting the temperature of said excitation light source by said cooling means for setting a wavelength of light emitted by said excitation light source in such a manner as to lie within an absorption spectrum of said solid laser medium but not coincident with a wavelength of a peak of the absorption spectrum.

8. A solid laser excitation method for exciting a solid laser medium, comprising:

cooling the solid laser medium;

setting an operating temperature of an excitation light source to provide a ray of light from the excitation light source having a wavelength that lies within the absorption spectrum of the solid laser medium and does not coincide with a wavelength of a peak of the absorption spectrum; and exciting the solid laser medium with the ray of light.

* * * * *